United States Patent
Kozlowski et al.

(10) Patent No.: US 8,886,703 B2
(45) Date of Patent: Nov. 11, 2014

(54) ADVERTISING AND FACILITATING MANAGEMENT ACCESS TO ADDED CAPABILITIES OF INTELLIGENT DEVICES IN A SYSTEM

(75) Inventors: Joseph Kozlowski, Austin, TX (US); Abeye Teshome, Austin, TX (US); Jon Hass, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 118 days.

(21) Appl. No.: 13/494,648

(22) Filed: Jun. 12, 2012

(65) Prior Publication Data

US 2013/0332605 A1 Dec. 12, 2013

(51) Int. Cl.
G06F 15/16 (2006.01)
G06F 15/173 (2006.01)
G06F 15/177 (2006.01)
G06F 15/167 (2006.01)

(52) U.S. Cl.
USPC ........... 709/202; 709/201; 709/203; 709/213; 709/216; 709/217; 709/219; 709/220; 709/221; 709/223; 709/225; 709/226; 709/227; 709/228; 709/229; 709/238; 709/239; 709/242; 709/244

(58) Field of Classification Search
USPC ................ 709/201–203, 213, 216, 217, 219, 709/220–221, 223, 225, 226, 227–229, 709/230–237, 238–244
See application file for complete search history.

(56) References Cited

U.S. PATENT DOCUMENTS

| | | | |
|---|---|---|---|
| 6,122,675 A | 9/2000 | Fisher et al. | |
| 6,212,575 B1 | 4/2001 | Cleron et al. | |
| RE39,486 E | 2/2007 | Cleron et al. | |
| 7,471,410 B2* | 12/2008 | Sato et al. | 358/1.15 |
| 7,529,675 B2* | 5/2009 | Maes | 704/270.1 |
| 7,536,182 B2 | 5/2009 | Zhang | |
| 7,631,033 B2* | 12/2009 | Zehler | 709/201 |
| 7,908,659 B2 | 3/2011 | Jeffries et al. | |
| 2002/0184373 A1* | 12/2002 | Maes | 709/228 |
| 2004/0006609 A1 | 1/2004 | Skrepetos | |
| 2004/0136027 A1* | 7/2004 | Zehler | 358/1.15 |
| 2009/0177772 A1* | 7/2009 | Guan | 709/224 |
| 2010/0131590 A1 | 5/2010 | Coleman et al. | |
| 2011/0055033 A1 | 3/2011 | Chen et al. | |

OTHER PUBLICATIONS

DMTF (Platform Level Data Model (PDLM) over MCTP Binding Specification, Apr. 23, 2009, Document No. DSP0241, version 1.0.0, from: http://dmtf.org/sites/default/files/standards/documents/DSP0241_1.0.0.pdf).*

Raritan ("Creating OpenRMSP: Developing a DASH Reference Implementation", copyright 2008 Raritan, from: http://www.raritan.com/resources/white-papers/open-standards/open-rmsp-white-paper.pdf).*

\* cited by examiner

*Primary Examiner* — Edward Kim
(74) *Attorney, Agent, or Firm* — Isidore PLLC

(57) ABSTRACT

A network interface device (NID) or management access point of a system is configured to: receive requests to register one or more additional capabilities provided by a second intelligent device integrated into the system; in response to the request, register the additional capabilities within a capabilities listing; advertise the additional capabilities as being an available within the system; and respond to a request from an external requestor for access to one of the additional capabilities by forwarding the management protocol and payload to the second intelligent device to enable the second intelligent device to perform all substantive processing required for the request. The NID establishes and maintains a network session between the second intelligent device and any external requestor requesting access to the additional capabilities. In response to receiving a response from the second intelligent device, the NID packages the response and forwards the response to the external requestor.

20 Claims, 8 Drawing Sheets

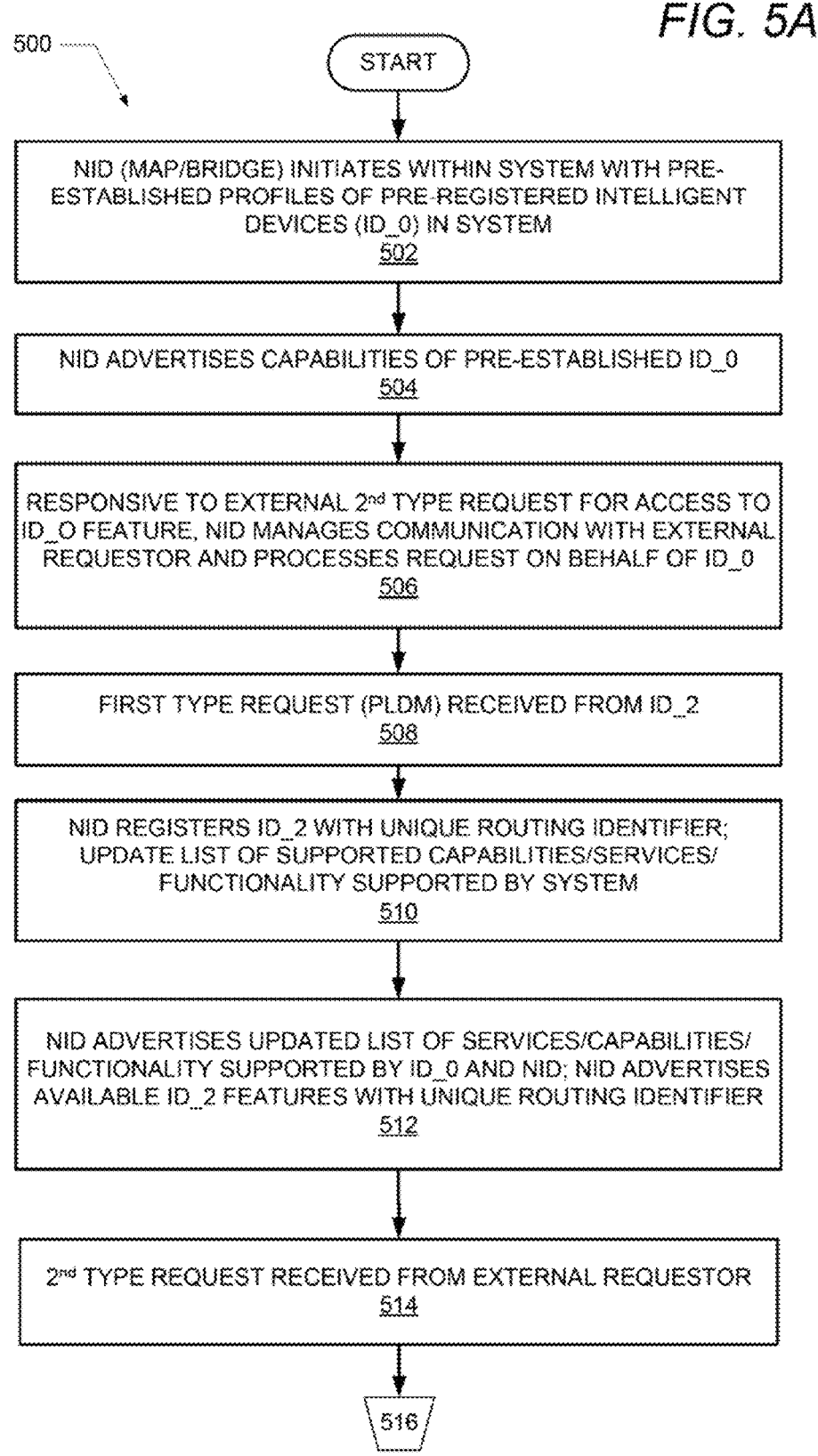

ADVERTISING AND FACILITATING MANAGEMENT ACCESS TO ADDED CAPABILITIES OF INTELLIGENT DEVICES IN A SYSTEM

BACKGROUND

1. Technical Field

The present disclosure generally relates to information handling systems and in particular to advertising and providing access to added capabilities of an intelligent device within an information handling system.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems typically have one or more intelligent devices contained therein. Included within these intelligent devices is a management access point or bridge, which is utilized as a communication interface of the information handling system to coordinate access by external devices to services, features, functions, resources, and/or capabilities provided by the other intelligent devices. Current implementations of management access points require prior knowledge and communication provisions to take advantage of unique features and capabilities of other intelligent devices in a system. For example, an off the shelf Baseboard Management Controller (BMC), such as Intel Corporation's Active Management Technology (Intel® AMT) or Broadcom® TruManage™ (TruManage™ is a trademark of Broadcom Corporation) must have full disclosure of other intelligent devices and the capabilities of such intelligent devices in order to allow an external management console to take advantage of these capabilities. The BMC and the intelligent device(s) require a pre-defined/pre-established internal protocol and both devices are required to be in constant synchronization to function. The pre-configured management access point can then receive, process, and respond to incoming requests and/or communication to the system, but only for those requests for access to the particular capabilities provided by the pre-known/pre-identified intelligent devices.

BRIEF SUMMARY

Disclosed are a network interface device (NID), operating as a management access point, and a method performed by the NID for advertising and facilitating access to capabilities of intelligent devices integrated into a general system. Also disclosed is an information handling system in which the NID and associated method can be implemented.

According to a first embodiment, the method comprises: receiving, at a management access point, a first type request to register an availability within the system of one or more additional capabilities provided by a second intelligent device that is integrated into the system, where the management access point is a first intelligent device; and in response to receiving the first type request, registering the one or more additional capabilities provided by the second intelligent device within a listing of advertised capabilities supported by the system. The method further comprises: advertising the one or more additional capabilities of the second intelligent device among the available capabilities of the system; and in response to receiving a second type request from an external requestor for access to a capability from among the one or more additional capabilities, the management access point: establishing a communication session between the external requestor and the second intelligent device; and facilitating the access by the external requestor to the capability requested from among the one or more additional capabilities by coordinating an exchange of one or more management protocols and corresponding payloads from the external requestor with the second intelligent device.

According to one implementation of the method, facilitating the access comprises: forwarding to the second intelligent device a management protocol and payload retrieved from the second type request, whereby the second intelligent device performs all substantive processing required for the management protocol and payload that are included within the second type request; and in response to receiving a response from the second intelligent device, packaging the response and forwarding the response to the external requestor. According to one aspect, the management access point operates as a facilitator for establishing and maintaining the communication session and for passing information and data between the second intelligent device and an external requestor that submits a second type request for access to a capability that is an additional capability provided by a second intelligent device which the management access point is not pre-configured to support.

One embodiment of the NID implementation provides a NID configured to enable access by one or more external devices to capabilities available within a system comprising one or more second intelligent devices. The NID comprises: a processing unit; one or more firmware modules on a storage device coupled to the processing unit, where the firmware modules are executed via the processing unit and configure the NID to: receive a first type request to register an availability within the system of one or more additional capabilities provided by a second intelligent device that is integrated into the system, where the NID is a first intelligent device and serves as an access point to the system; in response to receiving the first type request, register the one or more additional capabilities provided by the second intelligent device within a listing of advertised capabilities supported by the system. The firmware modules further configure the NID to: advertise the one or more additional capabilities of the second intelligent device among the available capabilities of the system; and in response to receiving a second type request from an external requestor for access to a capability from among the one or more additional capabilities, establish a communication session between the external requestor and the second intelligent device, and facilitate the access by the external requestor to the capability requested from among the one or more additional capabilities by coordinating an exchange of one or more management protocols and corresponding payloads from the external requestor with the second intelligent device.

Similar to the method, one implementation provides that the NID forwards/passes to the second intelligent device a management protocol and payload retrieved from the second type request, whereby the second intelligent device performs all substantive processing required for the management protocol and payload that are included within the second type request. Also, the one or more firmware modules configure the NID to, in response to receiving a response from the second intelligent device, package the response and forward the response to the external requestor.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
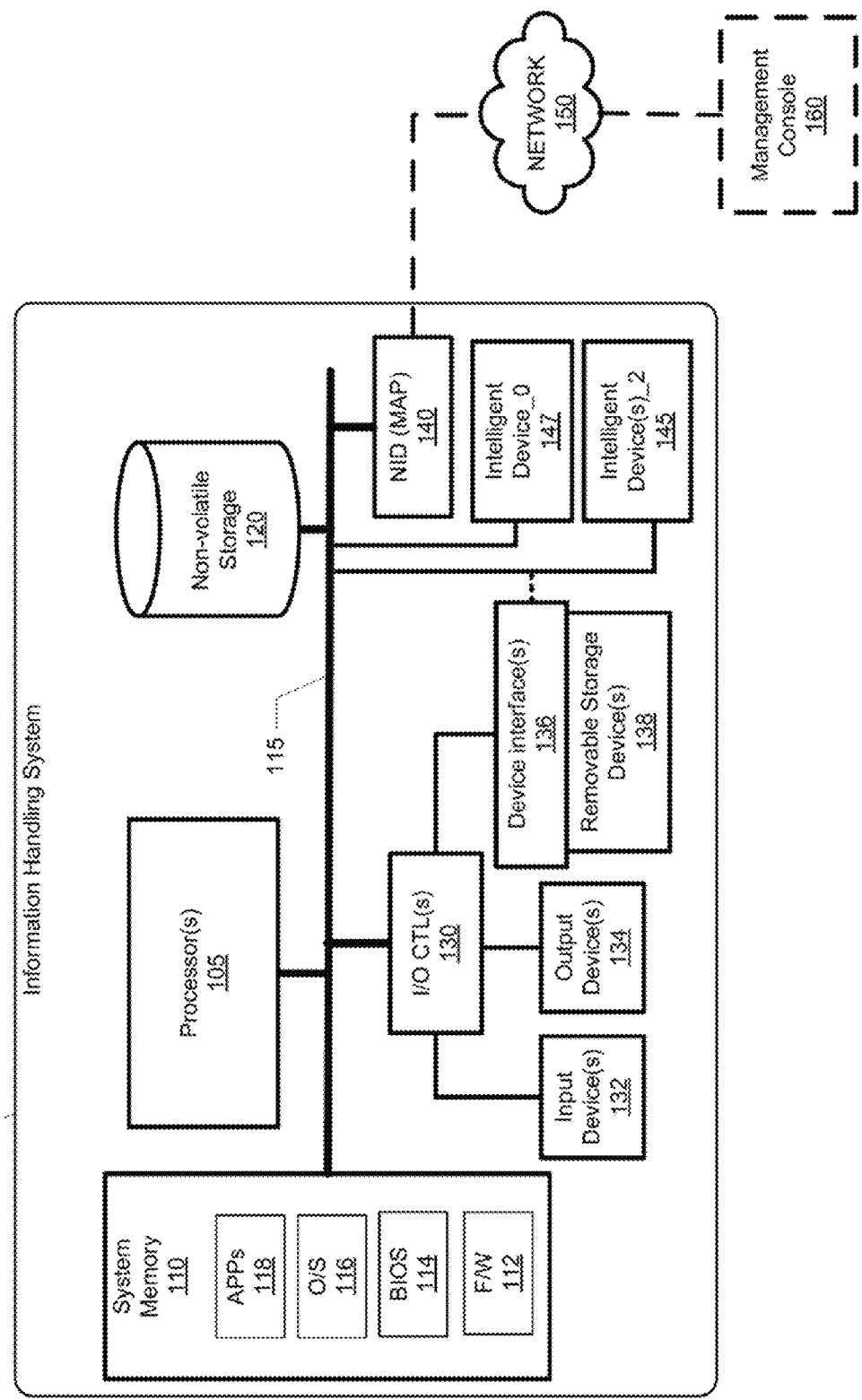
FIG. 1 illustrates an example information handling system within which various aspects of the disclosure can be implemented, according to one embodiment.

The illustrative embodiments provide a network interface device (NID) and a method performed by the NID for providing access to capabilities of intelligent devices located within a general system, such as an information handling system. One or more embodiments further provide an information handling system within which the NID and associated method can be implemented. The NID is a first intelligent device that provides the functionality of a management access point or bridge for the overall system. Aspects of the illustrative and described embodiments enable the NID to register and advertise the availability of and then facilitate access to additional capabilities (such as additional services, resources, and/or features or functionality) provided by a second intelligent device that is integrated into (or coupled to) an active system. Additional aspects of the illustrative and described embodiments also include the NID registering and advertising the additional capabilities of the second intelligent device, without any prior configuration of the NID or reconfiguration of the NID to be able to process the management protocol or payload corresponding to incoming requests for access to the additional capabilities.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Within the disclosure, references are made to the term "intelligent device". As utilized herein an intelligent device can be a hardware and/or software/firmware-enable functional component that is capable of independently performing functions within a larger system. For consistency in identifying and differentiating the various types of intelligent devices, reference is made herein to a network interface device (NID) as being a first intelligent device, which performs the functions of a management access point or bridge. Reference is also made to a second intelligent device (ID_2), which represents any functional component associated with the general system that provides one or more specific functions or capabilities that the NID is not pre-programmed to support. Further reference is made to an NID-supported intelligent device (ID_0), which represents any functional component within the system that provides one or more functions or capabilities that the NID is pre-programmed to support. Further distinguishing features of the various types of devices are provided within the disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

With reference now to the figures, and beginning with FIG. 1, there is depicted a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, IHS 100 includes processor(s) 105 coupled to system memory 110 via system interconnect 115. System interconnect 115 can be interchangeably referred to as a system bus, in one or more embodiments. Also coupled to system interconnect 115 is nonvolatile storage 120 within which can be stored one or more software and/or firmware modules and one or more sets of data that can be utilized during operations of IHS 100. These one or more software and/or firmware modules can be loaded into system memory 110 during operation of IHS 100. As shown, system memory 110 can include therein a plurality of such modules, including firmware (F/W) 112, basic input/output system (BIOS) 114, operating system (O/S) 114, and application(s) 118. These software and/or firmware modules have varying functionality when their corresponding program code is executed by processor(s) 105 or secondary processing devices, such as a service processor, within IHS 100. In one embodiment, one or more of these software-based modules can be utilized to configure one or more intelligent devices, such as second intelligent device(s) 145 or NID-supported intelligent device_0 147, during system start-up or thereafter, to enable the intelligent device 145/147 to operate within IHS 100.

IHS 100 also includes one or more input/output controllers 130 which support connection of, and processing of signals from one or more connected input device(s) 132, such as a keyboard, mouse, touch screen, or microphone, and to one or more connected output devices 134, such as a monitor or display device. Additionally, in one or more embodiments, one or more device interfaces 136, such as an optical reader, a universal serial bus (USB), a card reader, Personal Computer Memory Card International Association (PCMIA) slot, and/or a high-definition multimedia interface (HDMI), can be associated with IHS 100. Device interface(s) 136 can be utilized to enable data to be read from or stored to corresponding removal storage device(s) 138, such as a compact disk (CD), digital video disk (DVD), flash drive, or flash memory card. In one or more embodiments, device interface(s) 136 can also provide an integration point for connecting second intelligent device(s) 145 to IHS 100. In such implementation, device interfaces 136 can further include General Purpose I/O interfaces such as $I^2C$, SMBus, and peripheral component interconnect (PCI) buses. Alternatively, and as indicated by the dashed lines, embodiments can be provided in which the second intelligent device(s) 145 can be an integral part of IHS 100 and can be directly connected to system interconnect 115.

IHS 100 comprises a network interface device (NID) 140, also referred to as a network interface controller, that enables IHS 100 to communicate and/or interface with other devices, services, and components that are located external to IHS 100. These devices, services, and components interface with IHS 100 via an external network, such as example network 150, using one or more communication protocols. Management console 160 is an example of one of these devices, services, or components. Network 150 can be a local area network, wide area network, personal area network, and the like, and the connection to and/or between network and HIS 100 can be wired or wireless or a combination thereof. The remainder of the disclosure references specific functionality provided by a device such as NID 140 that enables NID 140 to operate as a management access point or bridge between intelligent devices (e.g., second intelligent device(s) 145 and intelligent device_0 147) within an example system and an external requestor (e.g., management console 160). In this capacity, NID 140 enables the external requestor to directly, or indirectly, access capabilities provided by the intelligent devices. Throughout the remainder of the disclosure, NID 140, which can be considered a first intelligent device, will be interchangeably referred to as a management access point for other intelligent devices within IHS 100.

For purposes of the disclosure, intelligent device_0 (ID_0) 147 represents one or more intelligent devices, which are known to NID 140, and which provides specific capabilities that NID 140 has been pre-programmed or pre-configured to support. In contrast, second intelligent device(s) (ID_2) 145 represents a second intelligent device that is added to IHS 100 without any pre-configuring of NID 140 to support the additional capabilities provided by second intelligent device 145. While illustrated as a separate physical component, it is important to note that, in one or more implementations, the second intelligent device 145 described herein can be a software-implemented construct and/or can be a subcomponent and/or a function provided within another larger component.

According to the described embodiments, NID 140 is capable of being coupled to at least one second intelligent device(s) 145 via system interconnect 115 (or wirelessly, in an alternate embodiment).

Figure 2:
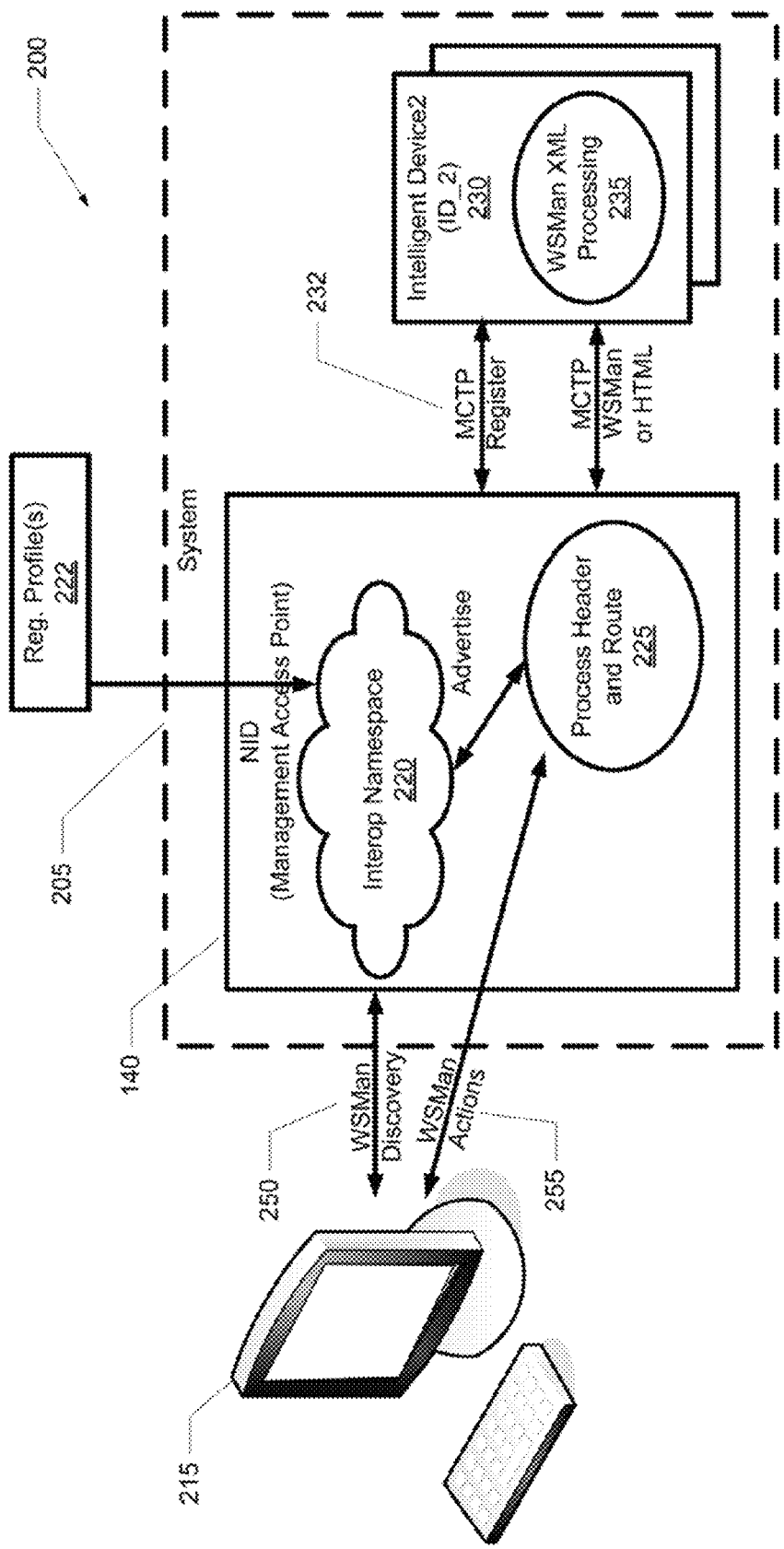
FIG. 2 illustrates an information exchange paradigm involving a management access point and a second intelligent device within a system and an external management console, in accordance with one or embodiment.

Referring now to FIG. 2, there are illustrated an example set of communication exchanges between a management access point, second intelligent devices, and a management controller within communication paradigm/environment 200. Communication paradigm/environment 200 comprises example system 205, which can be an IHS, such as IHS 100, in communication with an external management console 215. System 205 includes NID 140 and a plurality of second intelligent devices, of which second intelligent device (ID_2) 230 is identified. NID 140 operates as a management access point or bridge to enable access by management console 215 to one or more capabilities provided by one or more of the second intelligent devices in system 205. NID 140 contains and/or maintains an interop namespace 220 that is utilized during advertising by NID 140 of the capabilities of system 205. Interop namespace 220 includes a listing of registered profiles 222 for each other intelligent device in system 205 that provides capabilities that (1) can be advertised by NID 140 and (2) are accessible to management console 215 via NID 140. In one embodiment, the interop namespace 220 can provide a universal resource locator (URL) specific to the corresponding intelligent device. Thus, for example, for a device providing access to battery information, the interop namespace can be "https:\\webservice\battery", while for a device providing access to check the CPU status, the interop namespace can be "https:\\webservice\cpu". The interop namespace is then associated with the corresponding registered profile 222. In one embodiment, registered Profile 222 can include (1) a name of the device or capability, (2) version or model information, and (3) the interop namespace, which includes the unique routing identifier.

According to one aspect of the disclosure, system 205 contains multiple intelligent devices or entities, each having a specific set of capabilities or features. NID 140 has communication access outside of the computer system 205. Communication between management access point 140 and external components, entities or devices, such as management console 215, that are physically located outside of or external to system 205 includes and/or is completed via a common network protocol. The common network protocol is utilized for establishing a session between the two devices (i.e., system 205 and the external device), and for transporting and delivering of a payload. The communication further includes a commonly defined management protocol that is understood by both communicating devices. This commonly defined management protocol is utilized for operations to complete tasks. In one embodiment, the operations of the management protocol can also include uniquely defined operations. Additionally, the communication further includes and/or consists of a data model, which can be commonly defined in one embodiment or uniquely defined in another embodiment. Devices and/or entities outside of system 205, including management console 215, utilize the network protocol, management protocol and data model to complete tasks within the system.

Each of the communication exchanges and corresponding protocols between NID 140 and ID_2 230, as well as the communication exchanges and corresponding protocols between NID 140 and management console 215, is represented by a specific bi-directional arrow. These arrows can represent a communication occurring over a physical interface or bus and/or over a wireless interface, in different embodiments. These communications occur during implementation of various aspects of the innovative features of the disclosure, in accordance with one or more embodiments.

Following the communication arrows of FIG. 2, the communication exchanges between the example ID_2 230 and NID 140 includes a first type request that is generated by the second intelligent device when the second intelligent device is integrated into (i.e., connected within or to) the computer system 205. The second type request can be automatically generated by the second intelligent device or generated by one of the BIOS, OS, or other firmware or software within computer system 205. This generation of the second type request occurs once ID_2 230 has been successfully integrated into computer system 205 and the additional capabilities are available.

Figure 6A:
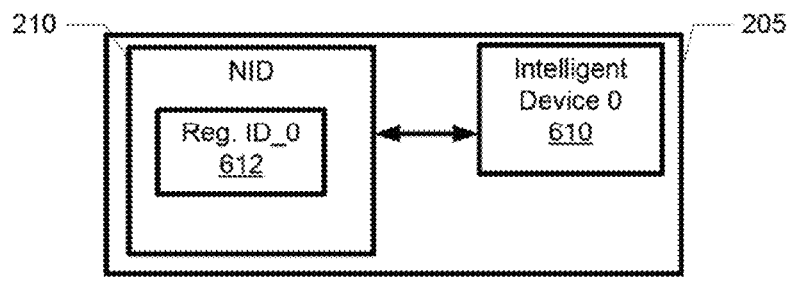
FIGS. 6A-6E provide a sequence of block diagrams illustrating the configuration of the NID and communication paths established between components at different stages of the method process of FIG. 5, according to one or more embodiments.
Figure 6B:
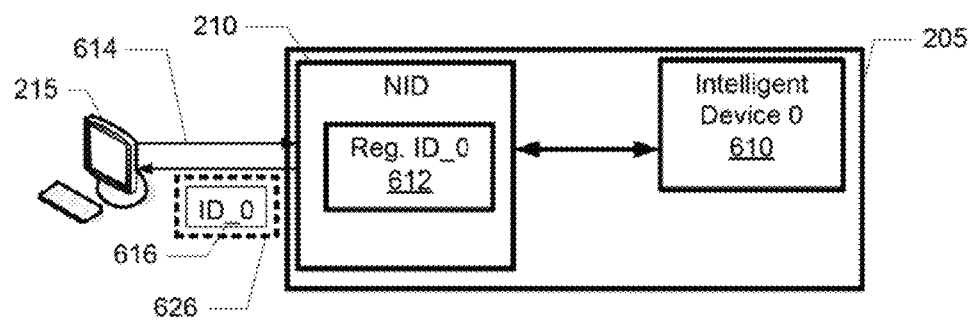
Figure 6C:
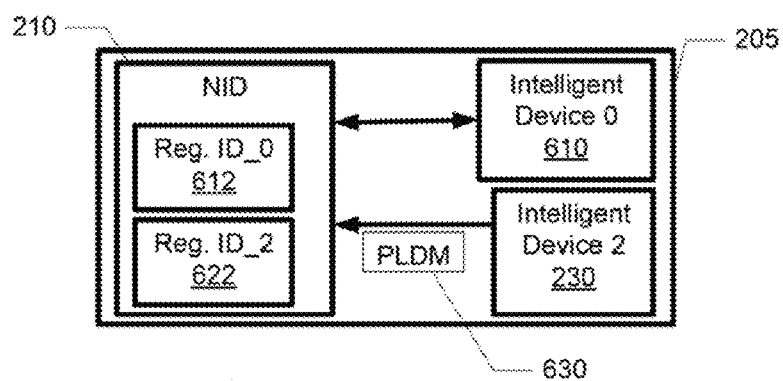

According to one embodiment (and as illustrated by FIG. 6C, described later), the first type request is a platform level data model (PLDM) packet. The PLDM packet is transmitted from the second intelligent device to the NID and/or the NID receives the PLDM packet via from the second intelligent device via management controller transport protocol (MCTP). The PLDM packet contains data necessary to construct an instance of a Registered Profile 222 that is utilized for outward advertisement of the one or more capabilities of the second intelligent device. Once the first type request is received by the NID, the one or more firmware modules that configure the NID to advertise the one or more additional capabilities configures the NID to place the Registered Profile 222 of the ID_2 230 within the interop namespace 220 provided via an interface associated with the NID. According to one aspect of the disclosure, an instance of the Registered Profile 222 references an implementation name space for ID_2 230 that is utilized as a routing identifier associated with the one or more capabilities being advertised. The routing identifier can be a node at which the second intelligent device connects to the system bus, where each node is uniquely identified and separately addressable.

In one embodiment, the one or more firmware modules that configures the NID to register the one or more additional capabilities comprises executable code that configures the NID to associate, within the listing, the one or more additional capabilities with a routing identifier that identifies a specific location within the system of the one or more additional capabilities. Further, the one or more firmware modules that configures the NID to advertise the one or more additional capabilities comprises executable code that configures the NID to advertise the one or more additional capabilities along with the associated routing identifier. Each capability of the second intelligent device that is advertised by the NID has an associated unique routing identifier, relative to other routing identifiers associated with capabilities of other devices within the system. Also, the one or more firmware modules that configure the NID to advertise the one or more additional capabilities comprise executable code that configures the NID to: receive a query from an external device for available capabilities of the system; and in response to receiving the query, forward to the external device a listing of all available capabilities of the system, including the one or more additional capabilities and the associated routing identifier.

Referring again to FIG. 2, according to one embodiment, ID_2 230 is integrated into system 205 after NID 140 has been pre-program/pre-configured to advertise and support a specific known set of capabilities of system 205. The known set of capabilities can be standard capabilities that are common across the industry or specifically programmed capabilities, whose existence are known to the manufacturer and/or programmer of NID 140 as requiring support within the particular system 205. ID_2 230 can be a physical device or component or a software-implemented entity/component such as a specific software module, firmware module or BIOS running in computer system 205 or another connected compute device. According to the described embodiments, ID_2 230 does not have access to communicate outside of the computer system 205 and requires NID 140 to provide such access. Further, ID_2 230 has certain capabilities and/or features that are unique to second intelligent device (i.e., is not available in the known set of capabilities supported by NID 140).

According to one aspect of the disclosure, NID 140 is designed with and/or programmed to include one or more firmware modules that support the addition of second intelligent devices (e.g., ID_2 230) and the additional capabilities being provided by the integration of one or more second intelligent devices after NID 140 is programmed and integrated (or vice versa) system 205. These one or more firmware modules configure NID 140 to: receive a first type request to register an availability within the system of one or more additional capabilities provided by a second intelligent device that is integrated into the system; in response to receiving the first type request, register the one or more additional capabilities provided by the second intelligent device within a listing of advertised capabilities supported by the system; and advertise the one or more additional capabilities of the second intelligent device as an available capability of the system.

According to another aspect of the disclosure, NID 140 advertises the capabilities of system 205 to the entities/devices that are outside of system 205. Included in this advertisement is an identifier or pointer to the capabilities inside of the system that are accessible to the external entities/devices. Based on the advertisement, the entities/devices outside of the system can utilize one or more of the advertised capabilities of the system 205 to complete specific tasks.

With the illustrative embodiment of FIG. 2, the common network protocol is a Web Services for Management (WSMan) protocol, and the second type request is a WSMan operation. With this implementation example, the one or more firmware modules further includes executable code that configures the NID to support a WSMan session between management console 215 and second intelligent device 230 by routing WSMan traffic, including WSMan traffic payload, between management console 215 and second intelligent device 145. Management console 215 discovers what capabilities are supported within system 205 through a WSMan discovery process 250. The discovery process 250 can be initiated via a push of the advertised capabilities by management access point in the interop namespace, in one embodiment. According to one aspect of this embodiment, the management access point can publish the available known capabilities to a centralized directory of services utilizing service locator protocol (SLP) during start up of the system. In an alternate embodiment, the advertising of available capabilities is completed following receipt of a WSMan discovery operation (250) from management console 215. The WSMan discovery operation (250) requests information about the registered profiles that are supported and the capabilities and/or manageability associated with the registered profiles.

Once management console 215 is aware of what profiles exists (i.e., the capabilities supported) for the system 205, management console 215 forwards one or more WSMan actions 255 to NID 140. As provided by FIG. 2, an internal process header and route utility 225 is provided within NID 140 to operate as a filter for all incoming WSMan actions 255. NID 140 filters the received requests by processing the header of the request and filtering out those requests that are directed to accessing the one or more additional capabilities and/or indicated as targeting the routing identifier of ID_2 230. For those WSMan actions 255 directed to ID_2 230, NID 140 routes the management protocol and payload of the WSMan action/request 255 to ID_2 230 via an internal routing protocol. Examples of the internal routing protocol that can be utilized include MCTP, WSMan and HTML. Once ID_2 230 receives the forwarded payload and management protocol, ID_2 230 processes the request (e.g., interprets the management protocol and processes the payload accordingly) via an internal WSMan XML processing utility 235. WSMan XML processing utility 235 also generates any required response to the received management protocol and payload.

The one or more firmware modules also configure the NID to: in response to receiving a second type request from an external requestor for access to a capability from among the one or more additional capabilities provided by the second intelligent device, forward to the second intelligent device a payload retrieved from the second type request, where the second intelligent device performs all substantive processing required for the payload that is retrieved and forwarded from the second type request. Also, the one or more firmware modules configure the NID to: in response to receiving a response corresponding to the forwarded payload from the second intelligent device, package the response and forward the response to the external requestor. With the above and other features provided by the NID, the NID operates solely as a facilitator for maintaining a network session and the NID simply passes information and data between the second intelligent device and any external requestor submitting a second type request for access to the one or more additional capabilities provided by the second intelligent device.

Additionally, according to one aspect of the disclosure, the NID further includes one or more firmware modules that configure the NID to: enable communication between the NID and external devices via a common network protocol that enables communication with one or more external devices, a commonly defined management protocol, and a data model comprising at least one of a commonly defined payload and operations and a uniquely defined payload and operations. The one or more firmware modules also configure the NID to perform a series of functions in response to receiving the second type request. Specifically, the NID: determines that the second type request is intended for the second intelligent device by retrieving from a header and/or the payload of the request information identifying a routing identifier that is advertised along with the one or more capabilities of the second intelligent device, where the routing identifier is unique relative to other routing identifiers associated with capabilities of other devices within the system.

The NID also: establishes a network session with the external requestor via the common network protocol; processes only a network layer of the network session; and forwards the entire management protocol and the payload of the second type request to said second intelligent device. In this manner, the NID passes responsibility for interpreting and responding to the management protocol and payload to the second intelligent device.

Figure 3:
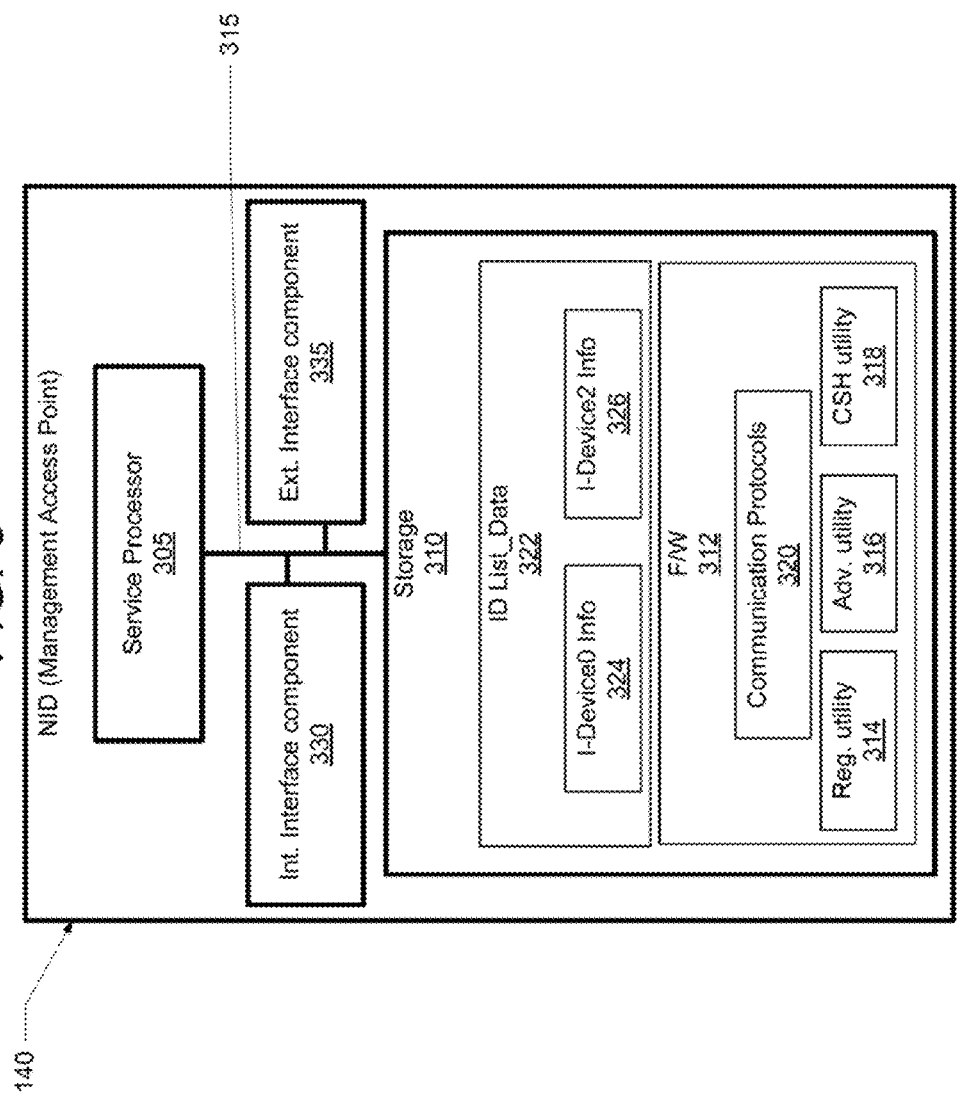
FIG. 3 is a block diagram illustrating one example of the component makeup of a network interface device (NID) that operates as a management access point or bridge within the described embodiments.

FIG. 3 provides some additional detail of physical and functional components of NID 140 (and/or NID 140, FIG. 1), including the one or more firmware modules that enable implementation of various features provided by the disclosure. NID 140 comprises a service processor 305 coupled to storage 310 via bus 315. Also coupled to service processor 305 via bus 315 are internal interface components/module 330 and external interface components/module 335. Internal interface components/module 330 comprises hardware and firmware components that enable NID 140 to communicatively connect to a second intelligent device within a larger system. Similarly, internal interface components 330 enable ID_2 to communicatively connect with NID 140 via either bus 315 or a wireless interface (not expressly shown). External interface components 335 comprise hardware and firmware components that enable NID 140 to communicatively connect to and exchange information with an external device, function, or entity via the common network protocol. Storage 310 contains firmware (F/W) 312 comprising one or more example firmware modules. Included among the one or more firmware modules are registration utility 314, advertising utility 316, and communication session handling (CSH) utility 318. Registration utility 314 enables NID 140 to receive and process a registration request of specific capabilities provided by a newly-integrated second intelligent device, and registration utility 314 registers the specific capabilities within the interop namespace. Advertising utility 316 supports the advertisement of the available capabilities of the system, including the associated routing identifier for each advertised capability. CSH utility 318 enables the establishment of a communication session between the second intelligent device and the external device requesting access to the one or more additional capabilities provided by the second intelligent device. Other features and/or functionality can be provided by these firmware modules, which can be provided within NID 140 as a single cohesive application or separate sub-routines or program code modules for performing different functions. When executed by service processor 305, program code associated with the one or more firmware modules configure the NID 140 to provide access to capabilities of one or more second intelligent devices integrated within the general system. Specific features and functionality associated with each firmware module are generally described within the descriptions provided herein. Firmware 312 also contains the necessary pseudo codes for each of a plurality of supported communication protocols 320. In one embodiment, the communication protocols comprise (1) an internal communication protocol that supports and/or enables communication between the NID and second intelligent device and (2) an external communication protocol that supports and/or enables communication between the NID and other devices external to the computer system.

Storage 310 of NID 140 also comprises intelligent device listing data 322 related to the various different ID_0s and/or ID_2s present within the general system and which are registered with NID 140. In the illustrative example, listing data 322 contains identifying information of ID_0 324 and identifying information of ID_2 326. The identifying information of each device can include device location information, referred to as a routing identifier, and an identifier of the one or more capabilities available through the specific second intelligent device. As provided herein, intelligent device 0 corresponds to a NID-supported intelligent device whose capabilities are known to and programmed within NID at the time of encoding of NID and/or while initializing NID within the general system. Also, consistent with the other figures, the device information can be synonymous with a Registered Profile of that specific intelligent device and includes the implementation namespace and routing identifier for the second intelligent device.

Figure 4:
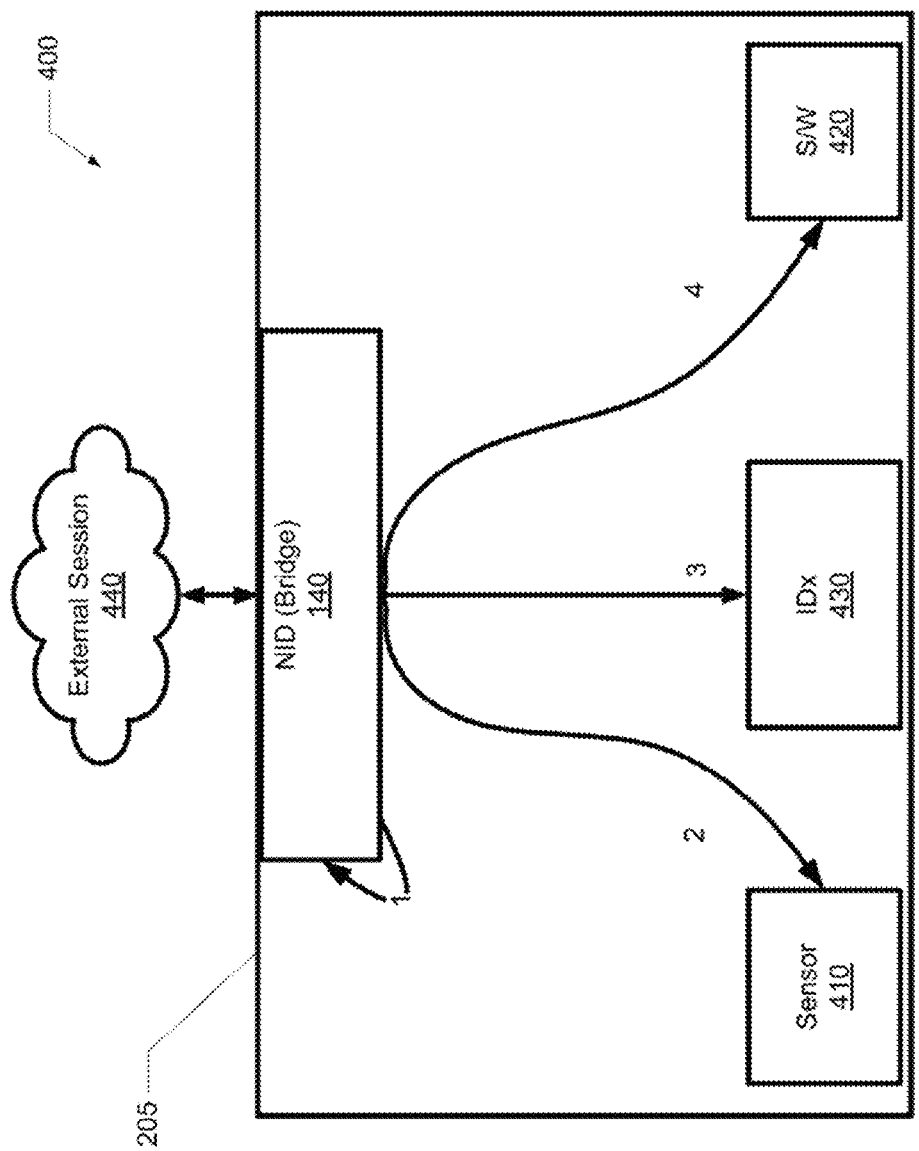
FIG. 4 is a diagram illustrating different types of second intelligent devices that can be supported within a system having a NID serving as a management access point or bridge to capabilities provided by the second intelligent devices, in accordance with one or more embodiments.

According to the described embodiments, the second intelligent device can be one of a hardware device and a software-enabled device provided via execution on a processing unit within the system of one of (a) a software module, (b) a BIOS, and (c) firmware. Also, the second intelligent device has capabilities that are unique relative to other capabilities available within the system at a time of integration of the second intelligent device into the system, and the second intelligent device utilizes the NID for access outside of the system. FIG. 4 illustrates a general representation of a session configuration 400 which illustrates different configurations of second intelligent devices that can complete a communication session with the NID operating as a bridge to an external session 440. As shown, system includes NID 140 serving as a bridge to an external session 440. Within example system 205 are example sensor 410, example intelligent device 420, and example software function 420, each communicative connected to NID 140. Each of the internal components to system 205 can be referred to as a second intelligent device, and each is able to connect to and exchange information with external session 440 and specifically with other external components via NID 140 operating as a bridge and/or an intermediary to external session 440.

Those of ordinary skill in the art will appreciate that the hardware components and basic configuration depicted in FIGS. 1-4 and described herein may vary. For example, the illustrative components within IHS 100 (FIG. 1) and NID 140 (FIG. 3) are not intended to be exhaustive, but rather are representative to highlight essential components that are can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 5B:
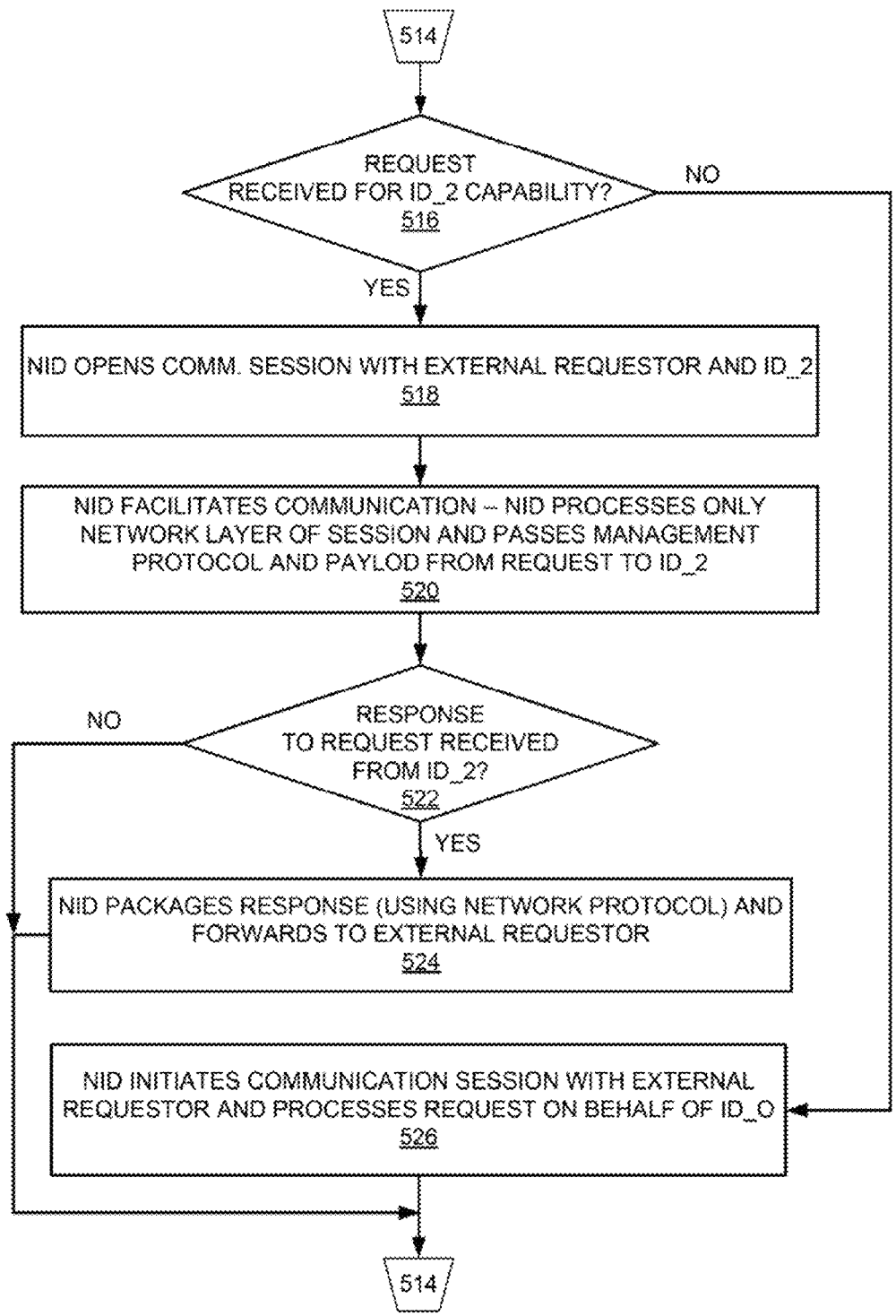
FIG. 5 (5A-5B) is a flow chart illustrating one embodiment of the method by which the various aspects of the disclosure are implemented at/within a NID operating as a management access point within a system having a second intelligent device, according to one embodiment.
Figure 6D:
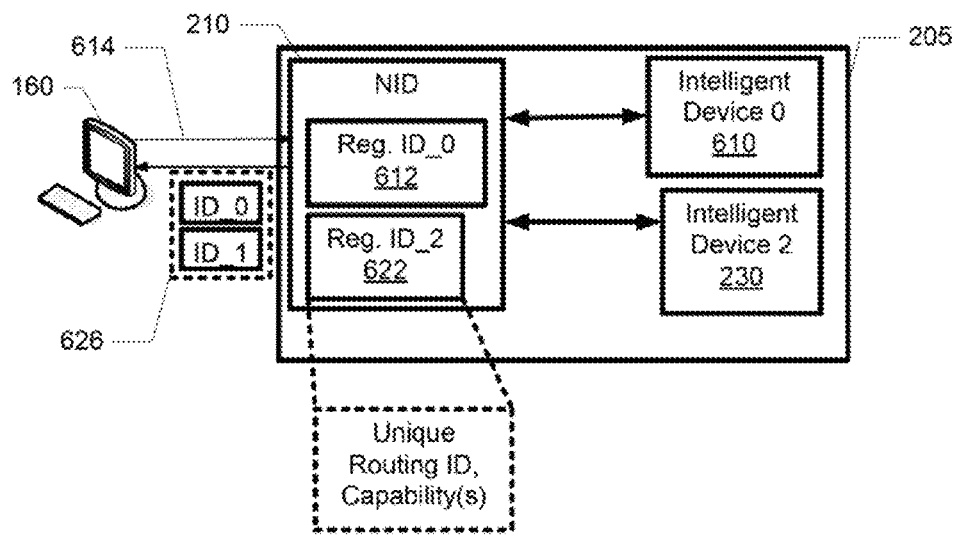

FIG. 5 (A and B) illustrates a flowchart of an exemplary method by which an intelligent device, and particularly NID 140 of each of the preceding figures performs the various processes to enable the one or more embodiments of the disclosure. The description of the method is provided with specific reference to the sequence illustrated by FIGS. 6C-6E and with general reference to specific components illustrated within the preceding figures. In one embodiment, method 500 is implemented via service processor 305 execution of code provided by the one or more firmware modules (generally represented as F/W 312) within NID 140 (see FIG. 3). It is however appreciated that the functionality presented by the described method can be provided via other types of implementation. For simplicity in describing method 500, all functions are assumed to be completed generally by a management access point, which is assumed to be NID 140 (FIGS. 1-3).

Method 500 begins at initiation/start block and proceeds to block 502 at which NID 140 initiates within system 205 with pre-established Register Profiles 612 of pre-programmed and/or known intelligent devices, such as intelligent device 0 (ID_0) 610, that exists within the system (see FIG. 6A). A communication path is also pre-established between NID 140 and ID-0 610, indicated by the bidirectional arrow connecting the devices. At block 504, NID 140 advertises the capabilities list 626 containing capabilities and routing information 616 corresponding to Registered Profile 612 of ID_0 610 (FIG. 6B). As provided at block 506, in response to receiving a second type (i.e., external) request for access to the capability made available through ID_0 610, NID 140 manages the communication with the external requestor and processes the request payload on behalf of ID_0 (block 506).

Method 500 proceeds to block 508 at NID 140 receives a first type request to register the availability within the system of one or more additional capabilities provided by a second intelligent device (ID_2) 230 that is newly integrated into system 210. As shown by FIG. 6C, the first type request can be a PLDM 630 that is transmitted via MCTP, in one embodiment. In response to receiving the first type request, NID 140 registers the one or more additional capabilities along with the routing identifier of ID_2 230 within a listing of capabilities supported by system 205 (block 510). Specifically, as shown by FIG. 6C, NID 140 creates a Registered Profile 622 in the interop namespace for ID_2 230 and accordingly updates the capabilities listing 626. As shown within the dashed box in FIG. 6D, the registered profile 622 includes a unique routing identifier associated with the advertised one or more capabilities of ID_2 230. As provided at block 512, NID 140 then advertises the one or more additional capabilities of ID_2 230 as well as the capabilities of ID_0 610 within the updated capabilities listing 626 (FIG. 6D) as available capabilities of system 205. Each capability is advertised with its corresponding routing identifier.

Figure 6E:
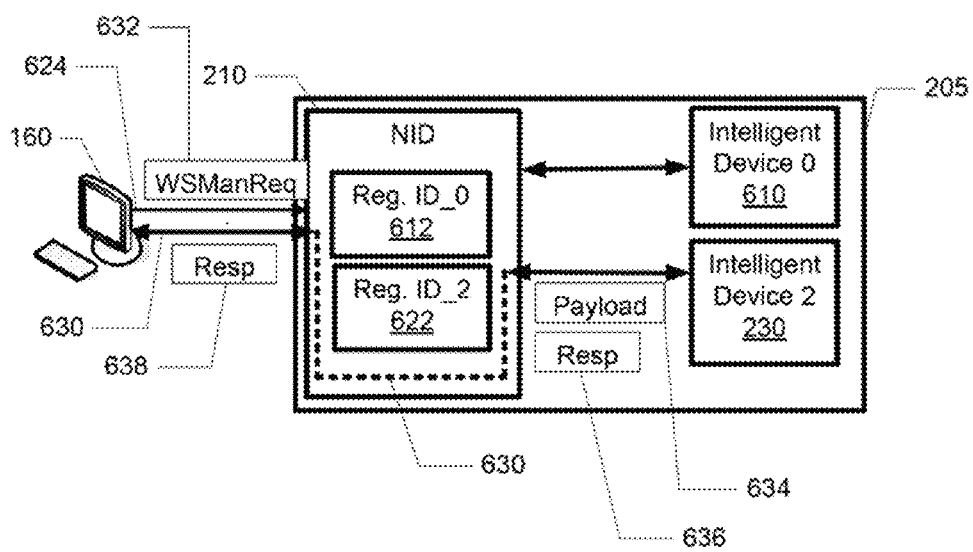

At block 514, NID 140 receives a second type request from an external requestor, management console 215. As shown by FIG. 6E, the request is a WSMan request 632, in one embodiment. At block 516, NID 140 determines whether the received second type request is for a capability provided by ID_2 230. If the second type request is not for one of the added capabilities provided by ID_2 230, then the request is for a capability provided by ID_0 610, and as provided at block 526, NID 140 takes over managing the communication with the external requestor and processes the request payload on behalf of ID_0 610. However, in response to receiving a second type request from an external requestor for access to a capability from among the one or more additional capabilities, NID 140 opens a communication session with both ID_2 and the external requestor (block 518). NID 140 establishes and facilitates a communication session between the external requestor and ID_2 230. FIG. 6E illustrates this communication channel 630 with dashed lines connecting the bi-directional lines between management console 215 and NID 140 and between NID 140 and ID_2 230. NID 140 also forwards/passes to ID_2 230 both the management protocol and payload 634 retrieved from the second type request (block 520). According to one embodiment, ID_2 230 is pre-configured to perform the required processing involved when information from the WSMan request 632 is passed from NID 140. ID_2 230 thus performs all substantive processing required for the management protocol and payload that is retrieved and forwarded from the second type request. Then, if the process triggered by receipt by ID_2 230 of the management protocol and payload includes generation of a response, ID_2 230 forwards the response 636 to NID 140, and NID 140 is further configured to package the response and forward the response to the external requestor 160 via the established communication channel. In one embodiment, an initial response of an acknowledgement is automatically triggered once ID_2 145 receives the request payload.

At block 522, NID 140 determines/detects whether a response to the forwarded management protocol and payload 634 has been received from ID_2 230. In response to receiving a response 636 from ID_2 145, NID 140 packages the response in the common network protocol and forwards the packaged response 638 to the external requestor (block 524). The method then returns to block 514. Accordingly, within the above method 500, for any external requestor submitting a second type request for access to the one or more additional capabilities provided by ID_2 145, ID_1 operates primarily as a facilitator that establishes and maintains a communication session and passing information and/or data between ID_2 145 and the external requestor. However, when a request is received for a capability provided by a NID-supported intelligent device, such as ID_0 610, where NID 140 has been pre-programmed or pre-configured to support that capability, NID 140 retrieves the management protocol and payload from the request and completes certain portions of the processing required, with the NID-supported intelligent device operating simply as a tool to enable that functionality of NID 140.

Other aspects of the method include the above features and/or functions described with reference to FIGS. 2-4. Thus, for example, according to one embodiment, advertising the one or more additional capabilities comprises placing the Registered Profile of the second intelligent device within an interop namespace provided via an interface associated with the management access point. Also, registering the one or more additional capabilities further comprises: associating, within the listing, the one or more additional capabilities with a routing identifier that identifies a specific location within the system of the one or more additional capabilities; and advertising the one or more additional capabilities comprises advertising the one or more additional capabilities along with the associated routing identifier. Further, in one or more embodiments, advertising the one or more additional capabilities further comprises: receiving a query from an external device for available capabilities of the system; and in response to receiving the query, forwarding to the external device a listing of all available capabilities of the system including the one or more additional capabilities and the associated routing identifier.

In one embodiment, the method further comprises enabling communication between the management access point and external devices utilizing (a) a common network protocol that enables communication with one or more external devices, (b) a commonly define management protocol, and (c) a data model comprising at least one of a commonly defined payload and operations and a uniquely defined payload and operations. Then, in response to receiving the second type request, the method comprises: processing a network layer of the communication session at the management access point to retrieve the routing identifier included within at least one of a header and a payload of the second type request; determining that the second type request is intended for the second intelligent device based on the retrieved routing identifier, wherein the routing identifier is unique relative to other routing identifiers associated with other capabilities of other devices within the system; and establishing the communication session with the external requestor and the second intelligent device via the common network protocol and processing only a network layer for packets exchanged during the communication session.

Aspects of the present disclosure recognize that there are implementations that utilize communication between the intelligent devices of a system to extend the capabilities of a management access point, such as NID 140 and NID 140 described herein. However the conventional implementations all require a protocol definition to be understood prior to the implementation. This protocol definition can be a standard interface or a proprietary interface. However, regardless of the type of interface, the implementation, operations, data model transport protocols, and other aspects of the conventional implementation that are used for the support all have to be known by all of the developers of the intelligent devices. Therefore, with the conventional approach, each implementation of a new intelligent device would require a large collaborative effort between the various vendors of the specific intelligent devices. These limitations restrict conventional systems from supporting the integration of a second intelligent device for which the management access point has not been pre-configured.

Accordingly, in overcoming this and other limitations of conventional systems, aspects of the disclosure allows for the capabilities of a management access point, specifically NID 140 herein, to be extended and/or enhanced to support additional capabilities within the system for which the management access point has not been configured to support. This enhancement involves additional firmware within the ID_1 to enable post-configuration registering and advertising of newly added capabilities and associated intelligent devices and management session creation and message passing functionality between an external management device and the second intelligent device. Thus, with this firmware enhancement, the management access point can enable external access to the newly added capabilities without requiring any pre-disclosure of the capability (or second intelligent device) to the vendor of the management access point and without requiring any post production configuration of the management access point to support the processing required for these added capabilities.

The second intelligent device is also configured with required firmware/software to register its capabilities and then utilize the session creation capability of the management access point to implement the added capability within the system. Upon integration, ID_2 delivers to ID_1 the data necessary to advertise its capabilities outside of the system. Included in this data and/or resulting advertisement is a unique routing identifier. ID_1 includes the new capabilities along with the routing identifier/pointer as part of its advertisement to the outside entities, creating a holistic view of the systems capabilities. Outside entities that understand the data model utilized by the capability in the advertisement can then utilize the additional feature by communicating with ID_1. When ID_1 receives traffic bound for the identifier advertised by ID_2, ID_1 will continue to handle the network layer of the session but pass the entire management protocol and the payload to ID_2. ID_2 will interpret the management protocol and its payload and respond accordingly.

In one specific implementation, the management access point can be an off the shelf BMC that is included in a system and is managed using a Desktop and mobile Architecture for System Hardware (DASH) interface. The BMC has some base functionality and features that is advertised over the DASH interface by instances of Registered Profile in the interop namespace. Those instances of Registered Profile also reference the location of the implementation names space for the features of this BMC. Integrated in the computer system is also an additional intelligent device, second intelligent device, which has additional capability not previously known to or supported by BMC. ID_2 delivers, over MCTP, a PLDM message with the necessary data to construct the instance of Registered Profile for outward advertisement. The instance of Registered Profile references the implementation name space for ID_2. In one embodiment, once registered, this namespace will be used as the routing identifier. Management access point maintains the network session with an external entity/device such as an Enterprise Management Console. However, when WSMAN operations targeting the namespace defined in the Registered Profile instance are received by ID_1, ID_1 routes the WSMAN traffic including its payload to ID2. Transparent to the Management console, the DASH WSMAN session is actually occurring between the Management console and ID_2. ID_1 merely handles the Network traffic and passes the WSMAN traffic back and forth between the other two parties.

In the above described flow chart, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the scope of the disclosure. Thus, while the method steps are described and illustrated in a particular sequence, use of a specific sequence of steps is not meant to imply any limitations on the disclosure. Changes may be made with regards to the sequence of steps without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for providing access to capabilities of intelligent devices located within a system, the method comprising:
    receiving, at a management access point, a first type request to register an availability within the system of one or more additional capabilities provided by a second intelligent device that is integrated into the system, wherein the management access point serves as an access point to the system and to the devices integrated within the system;
    in response to receiving the first type request, registering the one or more additional capabilities within a listing of available capabilities supported by the system;
    advertising the one or more additional capabilities among the available capabilities of the system; and
    in response to receiving a second type request from an external requestor for access to a capability from among the one or more additional capabilities of the second intelligent device that is available as a part of the system capabilities, the management access point:
        establishing a communication session between the external requestor and the second intelligent device; and
        facilitating the access by the external requestor to the capability requested from among the one or more additional capabilities by coordinating an exchange of one or more management protocols and corresponding payloads from the external requestor with the second intelligent device;
    wherein the management access point is pre-configured to support specific capabilities and is programmed to operate as a facilitator for establishing and maintaining the communication session and for passing information and data between the second intelligent device integrated within a same system as the management access point and an external requestor that submits a second type request for access to an advertised capability of the system that is an additional capability provided by the second intelligent device, which device has capabilities that the management access point is not pre-configured to support.

2. The method of claim 1, wherein facilitating the access comprises:
    forwarding to the second intelligent device a management protocol and payload retrieved from the second type request, wherein the second intelligent device performs all substantive processing required for the management protocol and payload that are included within the second type request; and
    in response to receiving a response from the second intelligent device, packaging the response and forwarding the response to the external requestor.

3. The method of claim 1, wherein receiving the first type request comprises receiving a platform level data model (PLDM) packet from the second intelligent device via management controller transport protocol (MCTP), wherein the PLDM contains data necessary to construct an instance of a Registered Profile for outward advertisement of the one or more capabilities of the second intelligent device.

4. The method of claim 3, wherein advertising the one or more additional capabilities comprises placing the Registered Profile of the second intelligent device within an interop namespace provided via an interface associated with the management access point, and wherein an instance of the Registered Profile references an implementation name space for the second intelligent device that is utilized as a routing identifier associated with the one or more additional capabilities being advertised.

5. The method of claim 1, wherein:
    registering the one or more additional capabilities further comprises associating the one or more additional capabilities with a routing identifier that identifies a specific location within the system of the one or more additional capabilities; and
    advertising the one or more additional capabilities comprises advertising the one or more additional capabilities along with the associated routing identifier;
    wherein each capability of the second intelligent device that is advertised by the management access point has an associated routing identifier that is unique relative to other routing identifiers associated with capabilities of other devices within the system.

6. The method of claim 4, wherein advertising the one or more additional capabilities further comprises:
    receiving a query from an external device for available capabilities of the system; and
    in response to receiving the query, forwarding to the external device the listing of all available capabilities of the system, including the one or more additional capabilities with the associated routing identifier.

7. The method of claim 1, further comprising:
    enabling communication between the management access point and external devices utilizing (a) a common network protocol that enables communication with one or more external devices, (b) a commonly define management protocol, and (c) a data model comprising at least one of a commonly defined payload and operations and a uniquely defined payload and operations; and
    in response to receiving the second type request, the management access point:

processing a network layer of the communication session at the management access point to retrieve the routing identifier included within at least one of a header and a payload of the second type request;

determining that the second type request is intended for the second intelligent device based on the retrieved routing identifier, wherein the routing identifier is unique relative to other routing identifiers associated with other capabilities of other devices within the system; and establishing the communication session with the external requestor and the second intelligent device via the common network protocol and processing only a network layer for packets exchanged during the communication session, and forwarding a payload of the packets to the second intelligent device for processing.

8. The method of claim 6, wherein:

the external requestor is a management console, the common network protocol is a Web Services for Management (WSMAN) protocol, and the second type request is a WSMAN operation; and said method further comprising facilitating a WSMAN session between the management console and the second intelligent device by routing WSMAN traffic, including WSMAN traffic payload, between the management console and the second intelligent device.

9. The method of claim 1, wherein the second intelligent device comprises one of a hardware device and a software-enabled device provided via execution on a processing unit within the system of one of a software module, a basic input output system (BIOS), and firmware, and wherein the second intelligent device has capabilities that are unique relative to other capabilities that are available within the system and supported by the management access point at a time of integration of the management access point into the system, and the second intelligent device utilizes the management access point for access outside of the system.

10. A network interface device (NID) configured as a first intelligent device to enable access to and from a system comprising one or more second intelligent devices via a common communication protocol with one or more external devices, the NID comprising:

a processing unit;

a storage coupled to the processing unit and containing one or more firmware modules that, when executed via the processing unit, configure the NID to provide access to capabilities of the one or more second intelligent devices located within the system, wherein the one or more firmware modules configures the NID to:

receive a first type request to register an availability within the system of one or more additional capabilities provided by a second intelligent device that is integrated into the system, wherein the NID serves as an access point to the system;

in response to receiving the first type request, register the one or more additional capabilities provided by the second intelligent device within a listing of advertised capabilities supported by the system;

advertise the one or more additional capabilities of the second intelligent device as an available capability of the system; and in response to receiving a second type request from an external requestor for access to a capability from among the one or more additional capabilities: establish a communication session between the external requestor and the second intelligent device; and facilitate the access by the external requestor to the capability requested from among the one or more additional capabilities by coordinating an exchange of one or more management protocols and corresponding payloads from the external requestor with the second intelligent device, wherein the second intelligent device performs all substantive processing required for the management protocol and payload that are included within the second type request; and in response to receiving a response corresponding to the forwarded payload from the second intelligent device, package the response and forward the response to the external requestor;

wherein the NID operates as a management access point within the system and serves as an access point to establish and maintain the communication session to pass information and data between the second intelligent device and an external requestor that submits a second type request for access to a capability that is an additional capability which the NID is not pre-configured to support;

wherein the NID is pre-configured to support specific capabilities and is programmed to operate as a facilitator for establishing and maintaining the communication session and for passing information and data between the second intelligent device integrated within a same system as the management access point and an external requestor that submits a second type request for access to an advertised capability of the system that is an additional capability provided by the second intelligent device, which device has capabilities that the management access point is not pre-configured to support.

11. The NID of claim 10, wherein:

the NID receives a platform level data model (PLDM) packet as the first type request from the second intelligent device via management controller transport protocol (MCTP), wherein the PLDM contains data necessary to construct an instance of a Registered Profile for outward advertisement of the one or more capabilities of the second intelligent device; and the one or more firmware modules that configure the NID to advertise the one or more additional capabilities comprises executable code that configures the NID to place the Registered Profile of the second intelligent device within an interop namespace provided via an interface associated with the management access point, and wherein an instance of the Registered Profile references an implementation name space for the second intelligent device that is utilized as a routing identifier associated with the one or more capabilities being advertised.

12. The NID of claim 10, wherein:

the one or more firmware modules that configures the NID to register the one or more additional capabilities comprises executable code that configures the NID to associate the one or more additional capabilities with a routing identifier that identifies a specific location within the system of the one or more additional capabilities;

each capability of the second intelligent device that is advertised by the management access point has an associated routing identifier that is unique relative to other routing identifiers associated with capabilities of other devices within the system;

the one or more firmware modules that configures the NID to advertise the one or more additional capabilities comprises executable code that configures the NID to advertise the one or more additional capabilities along with the associated routing identifier; and the one or more firmware modules that configure the NID to advertise the one or more additional capabilities comprise executable code that configures the NID to: receive a query from an external device for available capabilities of the system; and in response to receiving the query, forward to the external device a listing of all available capabilities of the system including the one or more additional capabilities and the associated routing identifier.

13. The NID of claim 9, further comprising one or more firmware modules that configure the NID to:

enable communication between the NID and external devices via (a) a common network protocol that enables communication with one or more external devices, (b) a commonly define management protocol, and (c) a data model comprising at least one of a commonly defined payload and operations and a uniquely defined payload and operations; and in response to receiving the second type request:
process a network layer of the communication session at the management access point to retrieve the routing identifier included within at least one of a header and a payload of the second type request;
determine that the second type request is intended for the second intelligent device based on the retrieved routing identifier, wherein the routing identifier is unique relative to other routing identifiers associated with other capabilities of other devices within the system; and
establish the communication session with the external requestor and the second intelligent device using the common network protocol and process only a network layer for packets exchanged during the communication session, and forward a payload of the packets to the second intelligent device for processing.

14. The NID of claim 13, wherein the external requestor is a management console, the common network protocol is a Web Services for Management (WSMAN) protocol, and the second type request is a WSMAN operation, the one or more firmware modules further comprising executable code that configures the NID to:

facilitate a WSMAN session between the management console and the second intelligent device by routing WSMAN traffic, including WSMAN traffic payload, between the management console and the second intelligent device.

15. The NID of claim 9, wherein the second intelligent device comprises one of a hardware device and a software-enabled device provided via execution on a processing unit within the system of one of a software module, a basic input output system (BIOS), and firmware, and wherein the second intelligent device has capabilities that are unique relative to other capabilities available within the system at a time of integration of the NID into the system, and the second intelligent device utilizes the NID for access outside of the system.

16. An information handling system comprising:
a processor;
a memory coupled to the processor via a system interconnect; and
a communication interface device (NID) that is a first intelligent device of multiple intelligent devices located within the information handling system, wherein the NID is capable of being coupled to at least one second intelligent device via the system interconnect and comprises a service processor unit and a storage coupled to the processing unit and containing one or more firmware modules that, when executed via the processing unit, configure the NID to provide access to capabilities of one or more second intelligent devices integrated within the information handling system, wherein the one or more firmware modules configure the NID to:

receive a first type request to register an availability within the system of one or more additional capabilities provided by a second intelligent device that is integrated into the system, wherein the NID serves as an access point to the system;

in response to receiving the first type request, register the one or more additional capabilities provided by the second intelligent device within a listing of advertised capabilities supported by the system;

advertise the one or more additional capabilities of the second intelligent device as an available capability of the system; and in response to receiving a second type request from an external requestor for access to a capability from among the one or more additional capabilities: establish a communication session between the external requestor and the second intelligent device; and facilitate the access by the external requestor to the capability requested from among the one or more additional capabilities by coordinating an exchange of one or more management protocols and corresponding payloads from the external requestor with the second intelligent device, wherein the second intelligent device performs all substantive processing required for the management protocol and payload that are included within the second type request; and in response to receiving a response corresponding to the forwarded payload from the second intelligent device, package the response and forward the response to the external requestor;

wherein the NID is pre-configured to support specific capabilities and is programmed to operate as a management access point within the system and serves as an access point to establish and maintain the communication session to pass information and data between the second intelligent device and an external requestor that submits a second type request for access to an advertised capability of the system that is an additional capability provided by the second intelligent device, which device has capabilities that the NID is not pre-configured to support.

17. The information handling system of claim 16, wherein:
the NID receives a platform level data model (PLDM) packet as the first type request from the second intelligent device via management controller transport protocol (MCTP), wherein the PLDM contains data necessary to construct an instance of a Registered Profile for outward advertisement of the one or more capabilities of the second intelligent device;

the one or more firmware modules that configure the NID to advertise the one or more additional capabilities comprises executable code that configures the NID to place the Registered Profile of the second intelligent device within an interop namespace provided via an interface associated with the management access point, and wherein an instance of the Registered Profile references an implementation name space for the second intelligent device that is utilized as a routing identifier associated with the one or more capabilities being advertised; and the external requestor is a management console, the common network protocol is a Web Services for Management (WSMAN) protocol, and the second type request is a WSMAN operation, the one or more firmware modules further comprising executable code that configures the NID to facilitate a WSMAN session between the management console and the second intelligent device by routing WSMAN traffic, including WSMAN traffic payload, between the management console and the second intelligent device.

18. The information handling system of claim 16, wherein:
the one or more firmware modules that configures the NID to register the one or more additional capabilities comprises executable code that configures the NID to associate the one or more additional capabilities with a routing identifier that identifies a specific location within the system of the one or more additional capabilities;
each capability of the second intelligent device that is advertised by the management access point has an associated routing identifier that is unique relative to other routing identifiers associated with capabilities of other devices within the system;
the one or more firmware modules that configures the NID to advertise the one or more additional capabilities comprises executable code that configures the NID to advertise the one or more additional capabilities along with the associated routing identifier; and
the one or more firmware modules that configure the NID to advertise the one or more additional capabilities comprise executable code that configures the NID to: receive a query from an external device for available capabilities of the system; and in response to receiving the query, forward to the external device a listing of all available capabilities of the system including the one or more additional capabilities and the associated routing identifier.

19. The information handling system of claim 16, wherein the NID further comprises one or more firmware modules that configure the NID to:

enable communication between the NID and external devices via (a) a common network protocol that enables communication with one or more external devices, (b) a commonly define management protocol, and (c) a data model comprising at least one of a commonly defined payload and operations and a uniquely defined payload and operations; and in response to receiving the second type request:
process a network layer of the communication session at the management access point to retrieve the routing identifier included within at least one of a header and a payload of the second type request;
determine that the second type request is intended for the second intelligent device based on the retrieved routing identifier, wherein the routing identifier is unique relative to other routing identifiers associated with other capabilities of other devices within the system; and
establish the communication session with the external requestor and the second intelligent device using the common network protocol and process only a network layer for packets exchanged during the communication session, and forward a payload of the packets to the second intelligent device for processing.

20. The information handling system of claim 16, wherein the second intelligent device comprises one of a hardware device and a software-enabled device provided via execution on a processing unit within the system of one of a software module, a basic input output system (BIOS), and firmware, and wherein the second intelligent device has capabilities that are unique relative to other capabilities available within the system at a time of integration of the NID into the system, and the second intelligent device utilizes the NID for access outside of the system.

* * * * *